(12) United States Patent
Wobben

(10) Patent No.: US 6,522,561 B1
(45) Date of Patent: *Feb. 18, 2003

(54) INVERTER FOR INJECTING SINUSOIDAL CURRENTS INTO AN ALTERNATING CURRENT NETWORK USING POSITIVE AND NEGATIVE HALF WAVE CIRCUITS

(76) Inventor: Aloys Wobben, Argerstrasse 19, D-26607 Aurich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/787,383
(22) PCT Filed: Sep. 7, 1999
(86) PCT No.: PCT/EP99/06565
§ 371 (c)(1), (2), (4) Date: May 30, 2001
(87) PCT Pub. No.: WO00/17995
PCT Pub. Date: Mar. 30, 2000

(30) Foreign Application Priority Data

Sep. 24, 1998 (DE) .......................... 198 43 692

(51) Int. Cl.$^7$ .......................... H02M 7/5387
(52) U.S. Cl. .......................... 363/132; 363/137
(58) Field of Search .......................... 363/132, 136, 363/137

(56) References Cited

U.S. PATENT DOCUMENTS

| | | | |
|---|---|---|---|
| 4,555,754 A | 11/1985 | Hennevin | 363/132 |
| 4,951,187 A | 8/1990 | Stemmler | 363/96 |
| 5,274,542 A | 12/1993 | Tanaka et al. | 363/96 |
| 5,459,655 A | 10/1995 | Mori et al. | 363/132 |
| 6,157,556 A | * 12/2000 | Wobben | 363/132 |
| 6,219,265 B1 | * 4/2001 | Bernet et al. | 363/137 |

FOREIGN PATENT DOCUMENTS

| | | |
|---|---|---|
| DE | 4042001 C2 | 7/1992 |
| DE | 4206263 C2 | 9/1992 |
| DE | 4114968 A1 | 11/1992 |
| DE | 19650994 C1 | 6/1998 |
| EP | 0430044 B1 | 4/1994 |
| EP | 0819563 A2 | 1/1998 |
| GB | 1108571 | 4/1968 |
| JP | 8294285 | 11/1996 |

OTHER PUBLICATIONS

Fuld, "Aufwandwarmer Thyristor–Dreistufen–Wechselrichter mit geringen Verlusten," etzArchiv Bd. 11, Nov. 1989. (English summary on p. 161).

* cited by examiner

Primary Examiner—Jeffrey Sterrett
(74) Attorney, Agent, or Firm—Seed IP Law Group PLLC

(57) ABSTRACT

The invention concerns an inverter for feeding sinusoidal currents into an ac network. The object of the present invention is to improve the ability to withstand short-circuits and to reduce the danger of a shortcircuit. The invention is based on the realisation of using only a single switching unit for producing a half-oscillation of a sinusoidal oscillation. Thus, for producing a positive half-oscillation of a sinusoidal oscillation, a different switching unit is used than for producing the negative part of the sinusoidal current. The consequence of this is that only one switch of a switching unit is cycled or actuated during the production of a positive half-oscillation and another switch during the production of the negative half-oscillation of a sinusoidal current. The risk of a short-circuit between the two switches is thus reduced to the time during the change from the positive to the negative or from the negative to the positive half-oscillation respectively.

11 Claims, 4 Drawing Sheets

INVERTER FOR INJECTING SINUSOIDAL CURRENTS INTO AN ALTERNATING CURRENT NETWORK USING POSITIVE AND NEGATIVE HALF WAVE CIRCUITS

BACKGROUND OF THE INVENTION

1. Field of the Invention

The invention concerns an inverter for feeding sinusoidal currents into an ac network or into a public power supply network.

2. Description of the Related Art

Figure 1:
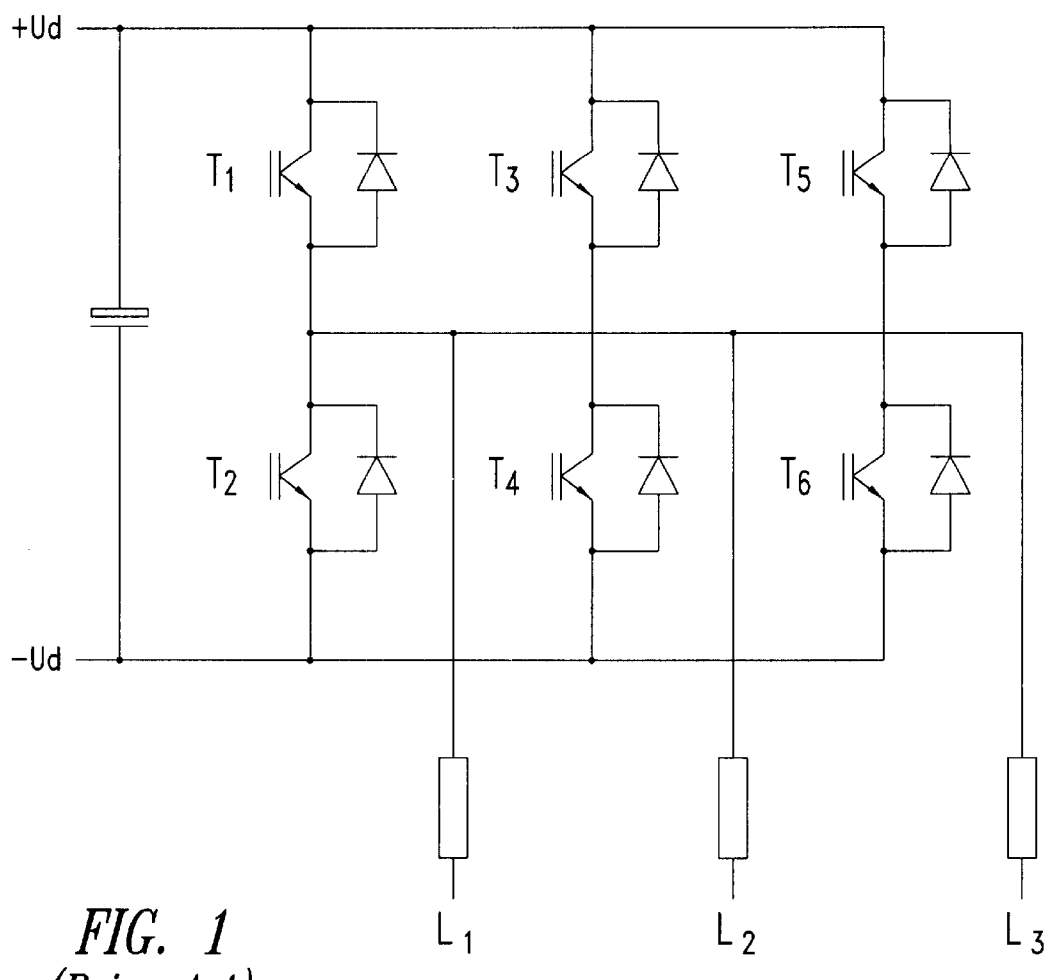

In the case of such inverters power switches are almost exclusively in the configuration of a three-phase bridge, as shown in FIG. 1. Such an inverter produces from a dc/voltage source a multi-phase alternating current of the phases U, V and W. By virtue of the anti-parallel connection of the power switches T1 to T6, as shown in FIG. 1, with suitable diodes, a four-quadrant mode of operation is possible and thus such an inverter circuit can also be used in highly versatile manner.

A disadvantage with such an inverter circuit is that extremely high energy flows occur in the case of a cross-shortcircuit of two switches, for example T1 and T2, which usually results in total destruction of the inverter and possibly causes a fire to break out and thus culminates in destruction of all connected parts of the installation. A further disadvantage is that, with the increase in the dc voltage, the respective components must be of ever increasing quality, which is only possible when using very expensive components.

SUMMARY OF THE INVENTION

The object of the present invention is to improve the ability to withstand short-circuiting of an inverter and at the same time to avoid the above-described disadvantages and in particular avoid as far as possible the need for expensive individual components.

In accordance with the invention that object is attained by an inverter having the features according to one of claims 1 to 3. Advantageous developments are set forth in the appendant claims.

The invention is based of the realization that only a single circuit or switching unit is to be used for the production of a half-oscillation of a sinusoidal oscillation. Therefore, for producing a positive half-oscillation of a sinusoidal oscillation, a different circuit or switching unit is used, than for producing the negative part of the sinusoidal current. The consequence of this is that the switching units for producing the positive half-oscillation and also the negative half-oscillation of the sinusoidal current are separated from each other and are connected together only by way of the common current tapping, wherein the production of the current in a switching portion cannot involve repercussions in the other switching portion because each switching portion is protected in relation to the other by a switch in the current tapping path.

The division of the sinusoidal output current of the inverter into a positive and a negative half-oscillation affords the possibility of sharing the dc voltage supply to the two switching portions for the negative and positive half-oscillations. Therefore the part of the inverter which produces the positive half-oscillation can be operated with a dc voltage. for example $U_{d1}$=660 volts and the switching portion of the inverter which produces the negative half-oscillation of the sinusoidal current can also be operated with a dc voltage, for example $U_{d2}$=660 volts. As a total dc voltage that then gives double the individual dc voltage, that is to say 1320 volts. That results in double the output power of the inverter overall, when using components which are only designed for a dc voltage of 660 V.

The output inductances of the individual switching units of the inverter are also acted upon for example during the positive current component only with the partial dc voltage $U_{d1}$ and not with the total dc voltage $U_{d1}+U_{d2}$. That also results in a saving in terms of material and cost. By virtue of the production of a half-oscillation of a sinusoidal oscillation with a single switching unit, the switching units for different half-oscillations can also be arranged remote from each other in spatial terms, which overall improves the safety and security of the inverter and all parts of the switching installation and also considerably simplifies arranging it in terms of the space involved. A particular advantage of the inverter design according to the invention is that the inductance of the output choke and thus the component costs required for that purpose can be halved.

BRIEF DESCRIPTION OF THE SEVERAL VIEWS OF THE DRAWING(S)

The invention will be described in greater detail hereinafter by means of an embodiment illustrated in the drawing. In the drawing:

FIG. 1 shows the basic principle of a known inverter.

Figure 2:
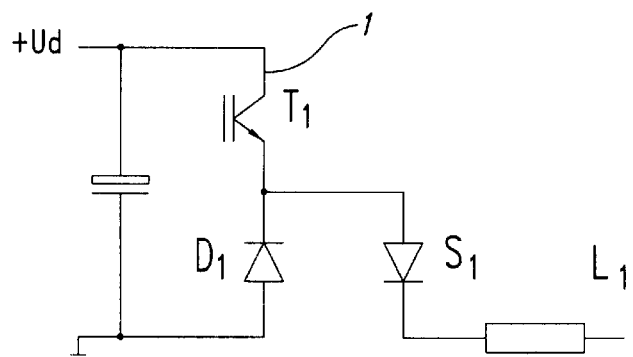
Figure 3:
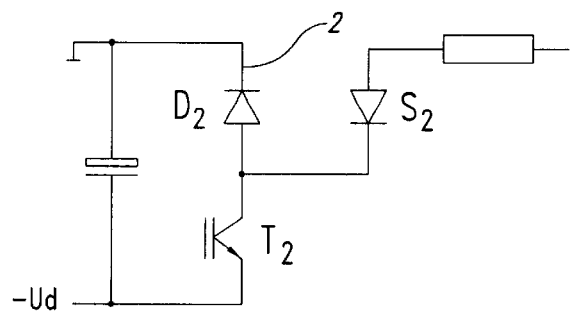
Figure 5:
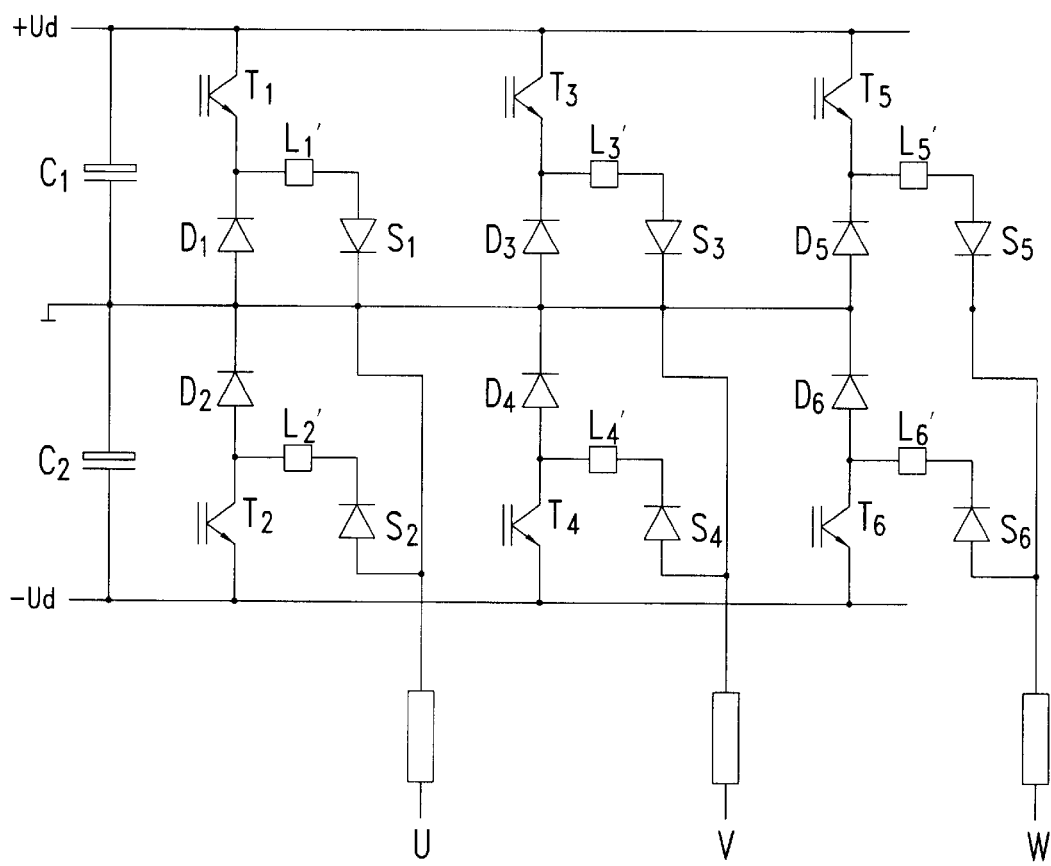
Figure 4:
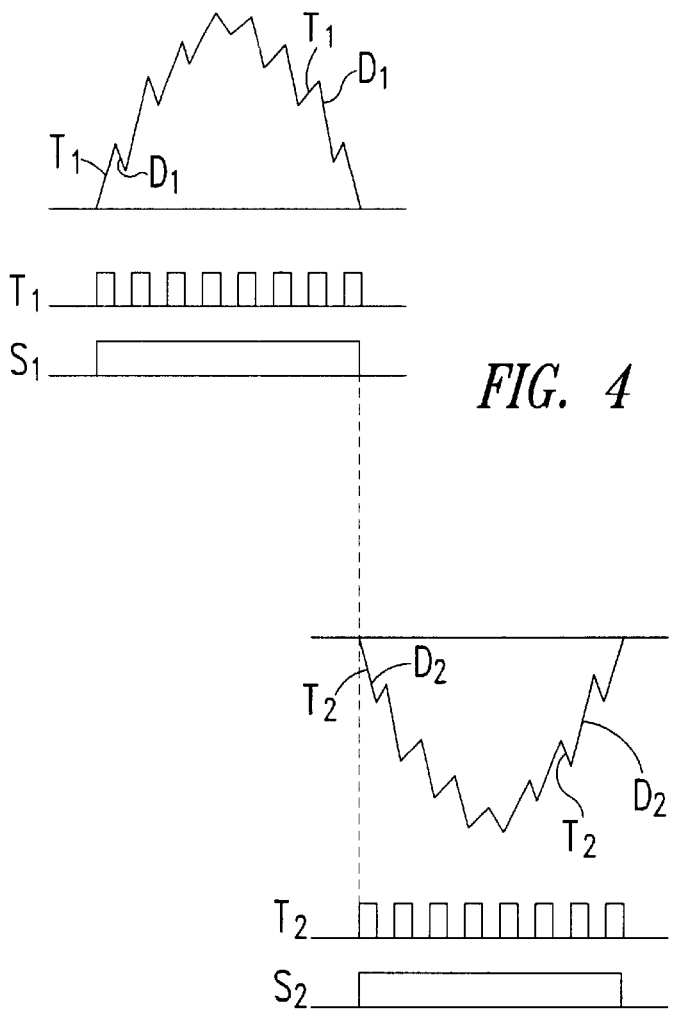
Figure 7:
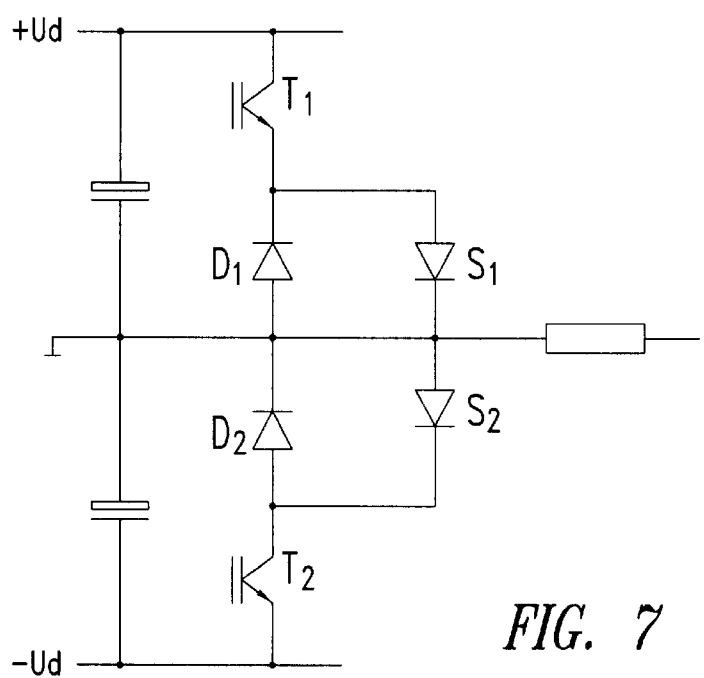
Figure 6:
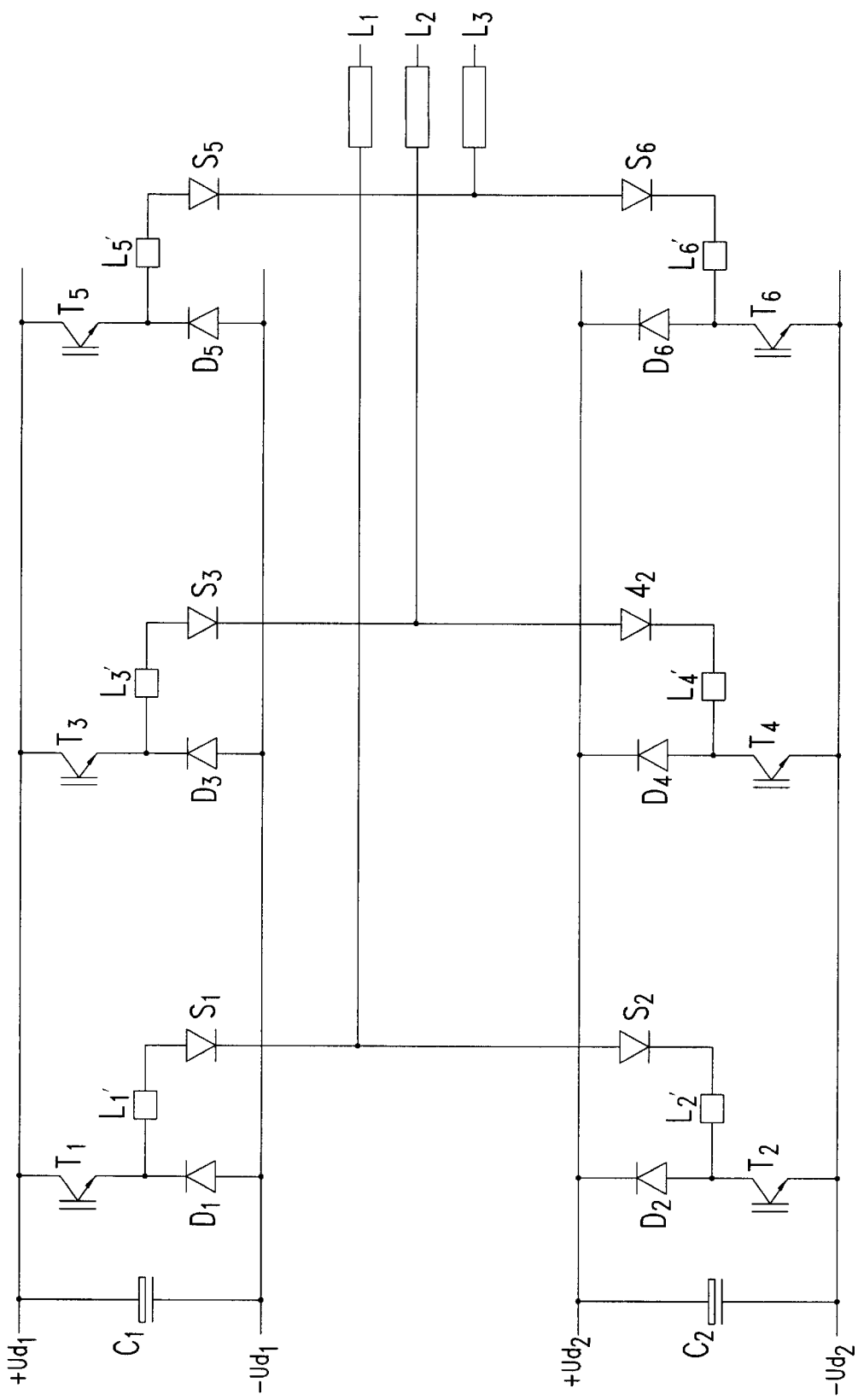
Figure 1:
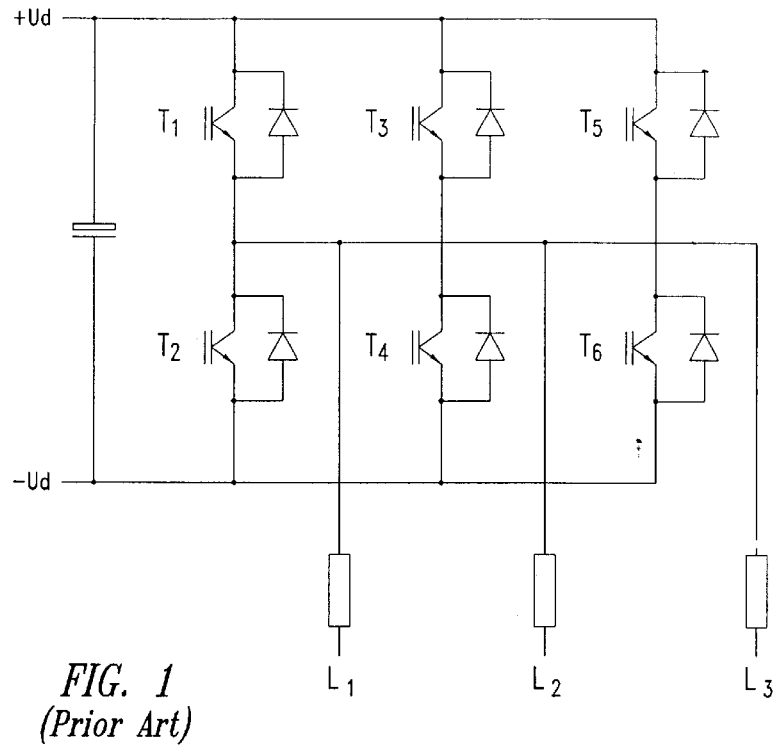
Figure 2:
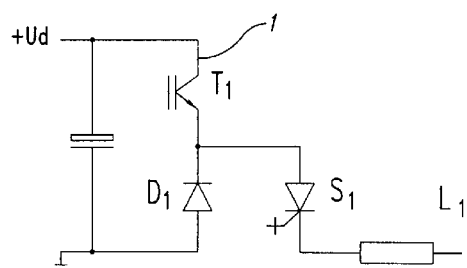
Figure 3:
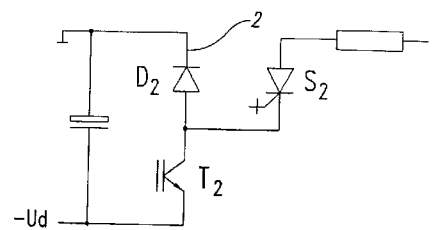
Figure 5:
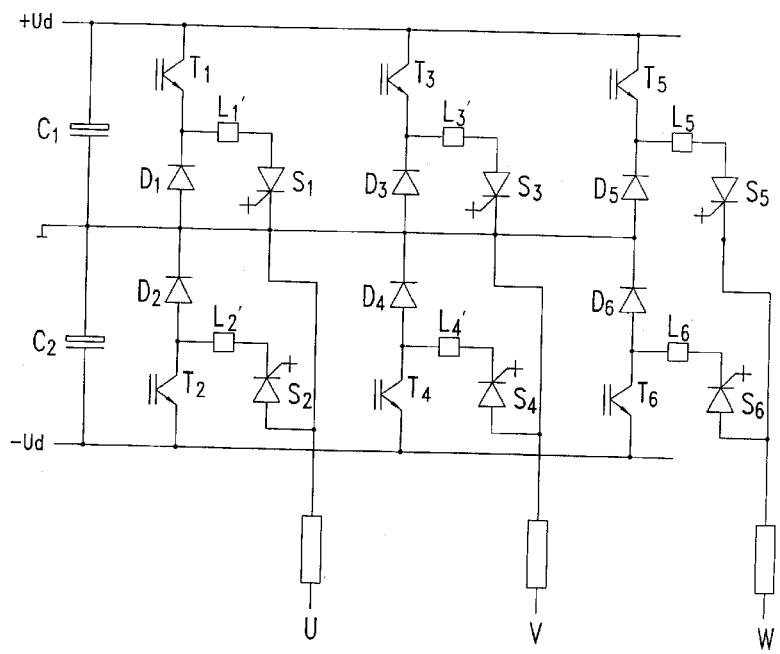
Figure 4:
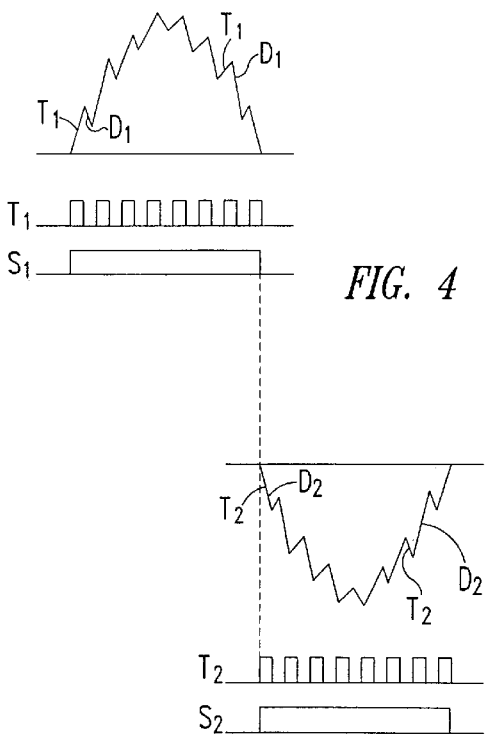
Figure 7:
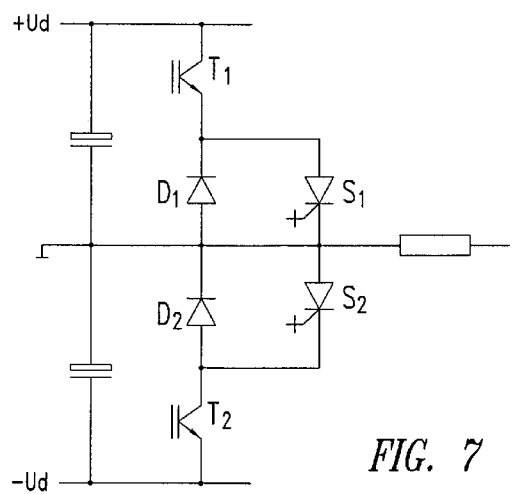
Figure 6:
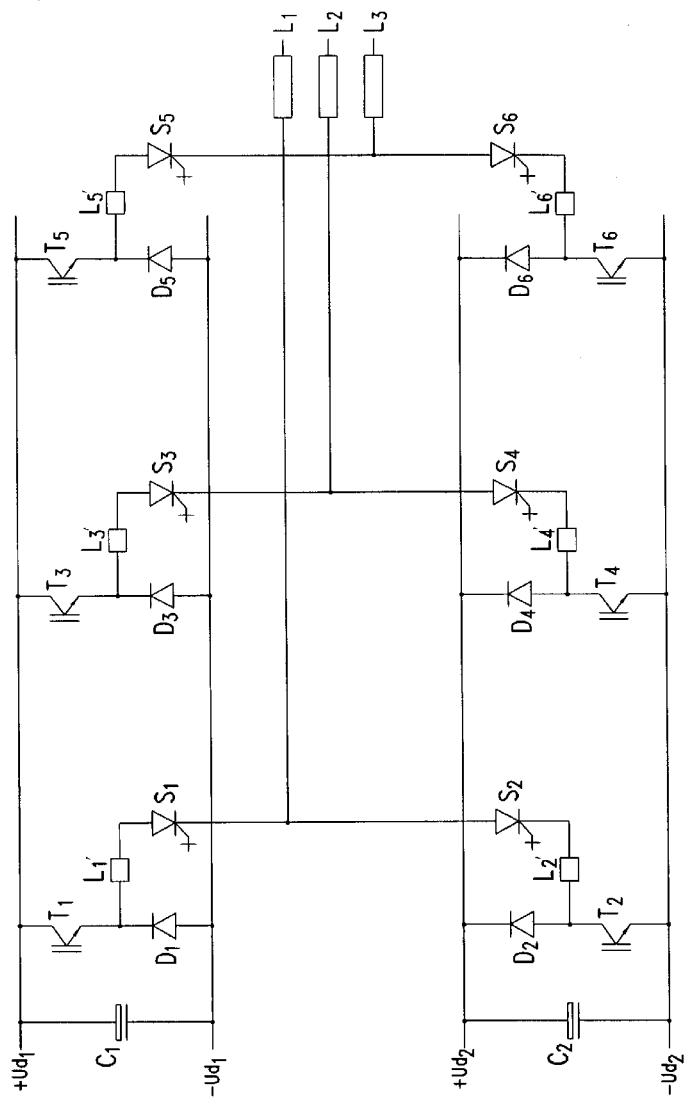

FIG. 2 shows the switching portion for the positive half-oscillation of the sinusoidal output current, FIG. 3 shows the switching portion for the negative half-oscillation of the sinusoidal output current, FIG. 4 shows a time diagram in respect of the sinusoidal output current with the switches T1, S1, T2, S2 shown in FIGS. 2 and 3, FIG. 5 shows a circuit diagram of a three-phase inverter according to the invention, FIG. 6 shows a circuit diagram illustrating the basic principle of an interconnection of a plurality of switching portions as shown in FIGS. 2 and 3 to produce a three-phase alternating current, and FIG. 7 shows the circuit diagram of the inverter for a single phase.

DETAILED DESCRIPTION OF THE INVENTION

FIG. 2 shows a circuit diagram of a transverse branch or a switching unit 1 for producing the positive component of the ac or three-phase network current from a dc voltage $U_d$. The switching unit 1 comprises a power transistor T1 as a first switch, for example an IGBT (isolated gate bipolar transistor) or GTO (gate turn off thyristor) and a diode D1 which is connected in series with the power switch T1 to the dc voltage terminal. The current tapping for the output current is between the power switch T1 and the diode D1. Disposed in the current tapping is a second switch S1 which in turn is connected in series with an output inductor L1. FIG. 3 shows in terms of the basic principle involved a circuit diagram of a switching unit for producing the negative part of the ac or three-phase network current with the reciprocal structure to the circuit shown in FIG. 2.

FIG. 4 shows the time diagram of the sinusoidal output current with the switching units 1 and 2 shown in FIGS. 2 and 3. Also shown therein is the switch-on behavior in relation to time of the power switches T1 and T2, as well as the switch-on/switch-off behavior of the switches S1 and S2 disposed in the current tapping. During the positive half-wave of the sinusoidal current (top left in FIG. 4) only the power switch T1 is switched on and off in the prescribed cyclic mode while the power switch T2 is switched off in that phase. During production of the positive half-wave of the sinusoidal current the switch S1 in the current tapping is switched on (closed) while at the same time the other switch S2 in the current tapping for the negative half-wave is switched off (opened). A "serrated" sinusoidal current is produced by a cyclic operation in respect of the on and off switching states of the power switch T1 and the influence of the diode D1. During the production of the negative half-wave of the sinusoidal current the conditions are precisely the reverse as for the production of the positive half-wave of the sinusoidal current. In production of the negative half-wave the switch S1 is switched off while the power switch T2 is switched on and off in a prescribed cyclic mode of operation and the switch S2 is always switched on. In the region of the current maximum of a sinusoidal wave the power switches T1 and T2 respectively are switched on for a longer time than in the region of a lower current level, in particular in the region of the zero-passages.

FIGS. 5 and 6 show the interconnection of a plurality of the switching units shown in FIGS. 2 and 3, to constitute an inverter in accordance with the invention for producing a three-phase alternating current. The difference between the illustrated circuits is that in FIG. 6 the switching portions for producing the negative half-oscillation of the output current are arranged separately from the switching portions for the positive half-oscillation of the output current. In this respect a separate arrangement can also signify that the switching portions are in different spaces and are connected only by way of their common current tappings. The switching units for producing the positive half-wave are connected to the dc voltage terminals $+U_{d1}$ and $-U_{d1}$. The switching portions for producing the negative half-wave of the sinusoidal current are connected to the dc voltage terminals $+U_{d2}$ and $-U_{d2}$.

FIG. 1 shows the circuit diagram of a known inverter which, by virtue of the anti-parallel connection of the power switches with the diode, permits a four-quadrant mode of operation and can thus be used in a highly versatile manner as a switching means, but in the case of a cross-shortcircuit of two switches such as T1 and T2 however involves the very high risk of a hard short-circuit which can result in total destruction of the inverter and can possibly also cause an outbreak of fire resulting in complete destruction of all parts of the installation connected thereto. To produce the positive half-wave of the output current the known inverter provides that the switches T1 and T2 are successively switched on and off. For a half-wave, this means that T1 and T2 are successively switched on and off a plurality of times during the half-wave, which already from a statistical point of view markedly increases the probability of a cross-shortcircuit, in comparison with the structure according to the invention as shown in FIG. 5 or FIG. 6 respectively.

FIG. 7 shows the interconnection of a switching portion for the positive half-oscillations of the output current with a switching portion for the negative half-oscillations of the output current for one of the three phases.

Hard short-circuits are prevented in principle by virtue of the separate current branches, positive and negative cross-branches—see FIGS. 2–7—in the interconnection of the individual switching units—see FIGS. 5–7. If nonetheless defective switching operations of the power switches in the different switching portions should occur, they are lower current level, in particular in the region of the zero-passages.

not only mutually decoupled and protected by way of the inductors L1'–L6'. L1–L6, but a short-circuit is definitively also made impossible by virtue of the fact that the switches S1–S6 disposed in the current tapping prevent one branch having repercussions in the other due to their being switched on and off in opposite relationship. The illustrated inverter design as shown in FIGS. 2–7 makes it possible to construct inverters involving a very high level of power. The decoupling chokes L1'–L6' between the current tappings of two interconnected switching units can be used at the same time as high-frequency chokes and also as filters for dU/dt-reduction. That provides that spurious emission is already drastically reduced directly after the power switches T1–T6.

The above-described inverter is suitable in particular for wind power converters or another electricity generator producing electrical direct current (for example a solar power installation). In the case of a wind power converter the generator usually produces a direct current or the generator produces an alternating current which however must then be rectified so that it can be converted by means of the above-described inverter into a network current/voltage. To provide an exact sinusoidal shape in respect of the output current it is advantageous if the switching on/off frequency of the power switches T1 (in relation to the positive half-wave) and T2 (in relation to the negative half-wave) respectively in the zero-passage is considerably higher than in the region of the current maxima. In the region of the current maxima the switching on/off frequency of the power switches T1 and T2 respectively is some 100 Hz (for example in the range between 100 and 600 Hz). In the region of the zero passages the switching on/off frequency of the power switches is some kHz (for example between 5 and 18 kHz).

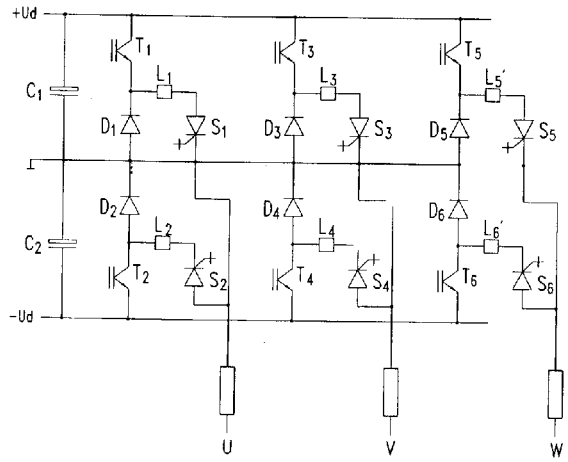

What is claimed is:

1. An inverter for feeding sinusoidal currents into an ac network comprising:
   a switching unit which produces the positive part of the network current, including:
   a) a first switch and a diode connected in series between a positive voltage and a common voltage, with a current tapping between the first switch and the diode, the current tapping configured to provide a load current to a load;
   b) connected to the current tapping is a second switch in series with the load, which remains closed during the production of the positive part of the network current for further providing the load current to the load, and
   c) a decoupling inductor connected in series with the second switch.

2. An inverter for feeding sinusoidal currents into an ac network comprising:
   a switching unit which produces the negative part of the network current, including:
   a) a first switch and a diode connected in series between a negative voltage and a common voltage, with a current tapping between the first switch and the diode, the current tapping configured to provide a load current to a load;
   b) connected to the current tapping is a second switch in series with the load, which remains closed during the production of the negative part of the network current for further providing the load current to the load, and
   d) a decoupling inductor connected in series with the second switch.

3. A device for supplying a sine wave current, comprising:

a first switching unit, including a first switch and a first diode connected in series between a positive voltage and a common voltage;

a first current load line coupled to a first current tap node positioned between the first switch and the first diode, and providing a first electrical current path to a load; and a second switch coupling the first current load line to the first current tap node and remaining closed during production of a positive half-wave of the sine wave current.

4. The device of claim 3, further comprising:

a second switching unit, including a third switch and a second diode connected in series between a negative voltage and a common voltage;

a second current load line coupled to a second current tap node positioned between the third switch and the second diode, and providing a second electrical current path to a load; and a fourth switch coupling the second current load line to the second current tap node and remaining closed during production of a negative half-wave of the sine wave current.

5. The device of claim 4 wherein the device further comprises control means for:

closing the second switch and opening the fourth switch during a positive portion of the sine wave current;

closing the fourth switch and opening the second switch during a negative portion of the sine wave current;

adjusting duty cycles of the first and third switches according to a current draw of the load.

6. The device of claim 4, further including a decoupling inductor in the second current load line, connected in series with the fourth switch.

7. The device of claim 3, further including a decoupling inductor in the first current load line, connected in series with the second switch.

8. A device for supplying a sine wave current, comprising:

a first switch configured to cycle open and closed a plurality of times during production of a positive half wave of the sine wave current;

a diode connected in series with the first switch;

a current tap node between the diode and the first switch;

a load line coupled to the current tap node and configured to carry current from the device to a load; and a second switch in the load line, in a series connection between the current tap node and the load, and configured to remain conductive during production of the positive half wave of the sine wave current, and to remain non-conductive during production of a negative half wave of the sine wave current.

9. The device of claim 8, further comprising an inductor in the current load line in series with the second switch.

10. A device for supplying a sine wave current, comprising:

a first switch configured to cycle on and off a plurality of times during production of a negative half wave of the sine wave current;

a diode connected in series with the first switch;

a current tap node between the diode and the first switch;

a load line coupled to the current tap node and configured to carry current from the device to a load; and a second switch in the load line, in a series connection between the current tap node and the load, and configured to remain conductive during production of the negative half wave of the sine wave current, and to remain non-conductive during production of a positive half wave of the sine wave current.

11. The device of claim 10, further comprising an inductor in the current load line in series with the second switch.

* * * * *

UNITED STATES PATENT AND TRADEMARK OFFICE
CERTIFICATE OF CORRECTION

PATENT NO.      : 6,522,561 B1                                          Page 1 of 1
DATED           : February 18, 2003
INVENTOR(S)     : Wobben It is certified that error appears in the above-identified patent and that said Letters Patent is hereby corrected as shown below:

Title page,
The title page showing an illustrated figure, should be deleted and substituted therefor the attached title page.

Drawings,
Delete drawing sheets 1-4, and substitute therefor the attached drawing sheets 1-4.

Signed and Sealed this

Twenty-sixth Day of August, 2003

JAMES E. ROGAN
*Director of the United States Patent and Trademark Office*

(12) United States Patent
Wobben

(10) Patent No.: US 6,522,561 B1
(45) Date of Patent: *Feb. 18, 2003

(54) INVERTER FOR INJECTING SINUSOIDAL CURRENTS INTO AN ALTERNATING CURRENT NETWORK USING POSITIVE AND NEGATIVE HALF WAVE CIRCUITS

(76) Inventor: Aloys Wobben, Argerstrasse 19, D-26607 Aurich (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/787,383

(22) PCT Filed: Sep. 7, 1999

(86) PCT No.: PCT/EP99/06565
§ 371 (c)(1),
(2), (4) Date: May 30, 2001

(87) PCT Pub. No.: WO00/17995
PCT Pub. Date: Mar. 30, 2000

(30) Foreign Application Priority Data

Sep. 24, 1998 (DE) .......................................... 198 43 692

(51) Int. Cl.[7] .................................................. H02M 7/5387
(52) U.S. Cl. ........................................ 363/132; 363/137
(58) Field of Search ................................. 363/132, 136, 363/137

(56) References Cited

U.S. PATENT DOCUMENTS

| | | | |
|---|---|---|---|
| 4,555,754 A | 11/1985 | Hennevin | 363/132 |
| 4,951,187 A | 8/1990 | Stemmler | 363/96 |
| 5,274,542 A | 12/1993 | Tanaka et al. | 363/96 |
| 5,459,655 A | 10/1995 | Mori et al. | 363/132 |
| 6,157,556 A * | 12/2000 | Wobben | 363/132 |
| 6,219,265 B1 * | 4/2001 | Bernet et al. | 363/137 |

FOREIGN PATENT DOCUMENTS

| | | |
|---|---|---|
| DE | 4042001 C2 | 7/1992 |
| DE | 4206263 C2 | 9/1992 |
| DE | 4114968 A1 | 11/1992 |
| DE | 19650994 C1 | 6/1998 |
| EP | 0430044 B1 | 4/1994 |
| EP | 0819563 A2 | 1/1998 |
| GB | 1108571 | 4/1968 |
| JP | 8294285 | 11/1996 |

OTHER PUBLICATIONS

Fuld, "Aufwandwarmer Thyristor–Dreistufen–Wechselrichter mit geringen Verlusten," etzArchiv Bd. 11, Nov. 1989. (English summary on p. 161).

* cited by examiner

Primary Examiner—Jeffrey Sterrett
(74) Attorney, Agent, or Firm—Seed IP Law Group PLLC

(57) ABSTRACT

The invention concerns an inverter for feeding sinusoidal currents into an ac network. The object of the present invention is to improve the ability to withstand short-circuits and to reduce the danger of a shortcircuit. The invention is based on the realisation of using only a single switching unit for producing a half-oscillation of a sinusoidal oscillation. Thus, for producing a positive half-oscillation of a sinusoidal oscillation, a different switching unit is used than for producing the negative part of the sinusoidal current. The consequence of this is that only one switch of a switching unit is cycled or actuated during the production of a positive half-oscillation and another switch during the production of the negative half-oscillation of a sinusoidal current. The risk of a short-circuit between the two switches is thus reduced to the time during the change from the positive to the negative or from the negative to the positive half-oscillation respectively.

11 Claims, 4 Drawing Sheets